US011204662B2

(12) United States Patent
Pedroso Moschini et al.

(10) Patent No.: US 11,204,662 B2
(45) Date of Patent: Dec. 21, 2021

(54) INPUT DEVICE WITH TOUCH SENSITIVE SURFACE THAT ASSIGNS AN ACTION TO AN OBJECT LOCATED THEREON (71) Applicant: Hewlett-Packard Development Company, L.P., Spring, TX (US)

(72) Inventors: Alexandre Pedroso Moschini, Porto Alegre (BR); Josue Pereira, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/345,871

(22) PCT Filed: Jan. 17, 2017

(86) PCT No.: PCT/US2017/013720
§ 371 (c)(1),
(2) Date: Apr. 29, 2019

(87) PCT Pub. No.: WO2018/136029
PCT Pub. Date: Jul. 26, 2018

(65) Prior Publication Data
US 2019/0324589 A1   Oct. 24, 2019

(51) Int. Cl.
G06F 3/041      (2006.01)
G06T 7/70       (2017.01)
(Continued)

(52) U.S. Cl.
CPC .......... G06F 3/0416 (2013.01); G06F 3/0482 (2013.01); G06F 3/04886 (2013.01); G06T 7/70 (2017.01)

(58) Field of Classification Search
None
See application file for complete search history.

(56) References Cited

U.S. PATENT DOCUMENTS 6,504,530 B1 * 1/2003 Wilson ................. G06F 3/0418
                                                       345/173
8,044,942 B1 * 10/2011 Leonhard ............... G06F 3/041
                                                       345/173
(Continued)

FOREIGN PATENT DOCUMENTS

WO   WO-2013019217 A1 *  2/2013  ........... G06F 3/0304
WO   WO-2015016864 A1 *  2/2015  ........... G06F 3/0425
(Continued)

OTHER PUBLICATIONS

Agarwal, A. et al., High Precision Multi-touch Sensing on Surfaces Using Overhead Cameras, 2007 < https://www.microsoft.com/en-us/research/wp-content/uploads/2007/10/cslate2.pdf >.

(Continued)

Primary Examiner — Kirk W Hermann
(74) Attorney, Agent, or Firm — Fabian VanCott (57) ABSTRACT An input device may include a touch sensitive surface and a camera wherein the camera scans the touch sensitive surface with at least one object on the touch sensitive surface and creates an image and, with a processor, maps the at least one object to a location on the touch sensitive surface wherein an input action is assigned to the object.

20 Claims, 9 Drawing Sheets (51) Int. Cl.
*G06F 3/0482* (2013.01)
*G06F 3/0488* (2013.01)

(56) References Cited

U.S. PATENT DOCUMENTS

| | | | |
|---|---|---|---|
| 9,064,246 B1* | 6/2015 | Anderson | G06Q 20/00 |
| 2003/0174125 A1* | 9/2003 | Torunoglu | G01S 5/02 |
| | | | 345/168 |
| 2005/0168448 A1 | 8/2005 | Simpson | |
| 2010/0259633 A1* | 10/2010 | Kii | G06F 3/038 |
| | | | 348/222.1 |
| 2013/0346924 A1* | 12/2013 | Morrill | G06F 3/04845 |
| | | | 715/863 |
| 2014/0176735 A1 | 6/2014 | Short et al. | |
| 2014/0325435 A1* | 10/2014 | Jung | G06F 3/04845 |
| | | | 715/790 |
| 2016/0117061 A1 | 4/2016 | Hodgart et al. | |
| 2016/0202843 A1 | 7/2016 | Suggs | |
| 2016/0313820 A1* | 10/2016 | Ancona | G06F 3/04842 |
| 2016/0320920 A1* | 11/2016 | Morris | G06F 3/0416 |
| 2017/0018120 A1* | 1/2017 | Li | G06T 19/006 |
| 2018/0121076 A1* | 5/2018 | Hamada | G06F 3/04845 |

FOREIGN PATENT DOCUMENTS

| | | |
|---|---|---|
| WO | WO-2015047223 A1 | 4/2015 |
| WO | WO-2016118173 A1 | 7/2016 |

OTHER PUBLICATIONS

Katz, I et al., A Multi-touch Surface Using Multiple Cameras, Jun. 3, 2007, < http://airlab.stanford.edu/WSNL/papers/acivs07_hand.pdf >.

* cited by examiner

INPUT DEVICE WITH TOUCH SENSITIVE SURFACE THAT ASSIGNS AN ACTION TO AN OBJECT LOCATED THEREON

BACKGROUND

Input devices associated with computing devices are developed to allow better interaction between the computing device and the user. Keyboards, mice, screens, and graphical input devices, among others, all have been developed to increase and provide relatively better user interaction with the computing device.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Input devices associated with a computing system generally come in a set form. Keyboards, for example, include a number of rows of letters, numbers, and symbols laid out in a set predetermined manner. Indeed, a QWERTY keyboard, for example, includes the Latin script letters of the alphabet set out in a specific arrangement such that each user may easily implement the device based on the user's previous experience with such a keyboard. However, such an arrangement may not be beneficial to all persons. Indeed, where a keyboard is used by a plurality of users who may or may not be trained to use a QWERTY keyboard, it may prove difficult for those not trained to use the QWERTY keyboard to assimilate to the that style of keyboard. Taking into consideration that, especially where other languages are used, a QWERTY keyboard input device may reduce productivity, a user may be left to purchase or transport their own style of keyboard so as to actually interface with the computing device effectively.

Such an issue with exiting input devices may not necessarily be limited to keyboards but also may extend to other types of input devices and user-perceived ergonomic disadvantages of the input device. Using the keyboard as an example again, certain keyboards have been manufactured such that at least a portion of the keys are not aligned in a straight row. This has been done to allow a user the address the keys on the keyboard in a relatively more comfortable way. However, despite the layout of the keys being changed, this ergonomic change is a permanent change that may not be beneficial to all users.

Other input devices such as video game controllers may also have similar disadvantages due to the rigidly of the "one shape fits all users" form. Instead of being ergonomically advantageous to all users, these input devices are made to be ergonomically advantageous to most users leaving some user to accept the ergonomic form and actuation of the input device and struggle to learn the actions associated with each button or key.

The present specification, therefore describes an input device that includes a touch sensitive surface and a camera wherein the camera scans the touch sensitive surface with at least one object on the touch sensitive surface and creates an image and, with a processor, maps the at least one object to a location on the touch sensitive surface wherein an input action is assigned to the object.

The present specification further describes a method of creating an input device that includes capturing an image of at least one object on a surface of a touch sensitive device; receiving user actuated input from the touch sensitive device at the location of the at least one object; mapping the received user actuated input to the surface of the touch sensitive device; and receiving instructions to assign an action to the at least one object.

The present specification also describes a computing device that includes a processor and an input device that includes a touch sensitive mat, a projector, and a camera wherein the processor receives an image of at least one object positioned on the touch sensitive mat and derives positional data of the at least one object; and wherein the processor receives an indication of an action to be assigned to the at least one object.

As used in the present specification and in the appended claims, the term "touch sensitive surface" or "touch sensitive device" are meant to be understood as any surface or device that can detect a human touch. In some examples, the detected touch is that of a touch applied to any number of layers of material placed over the surface or device.

Additionally, as used in the present specification and in the appended claims, the term "a number of" or similar language is meant to be understood broadly as any positive number comprising 1 to infinity.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

Figure 1:
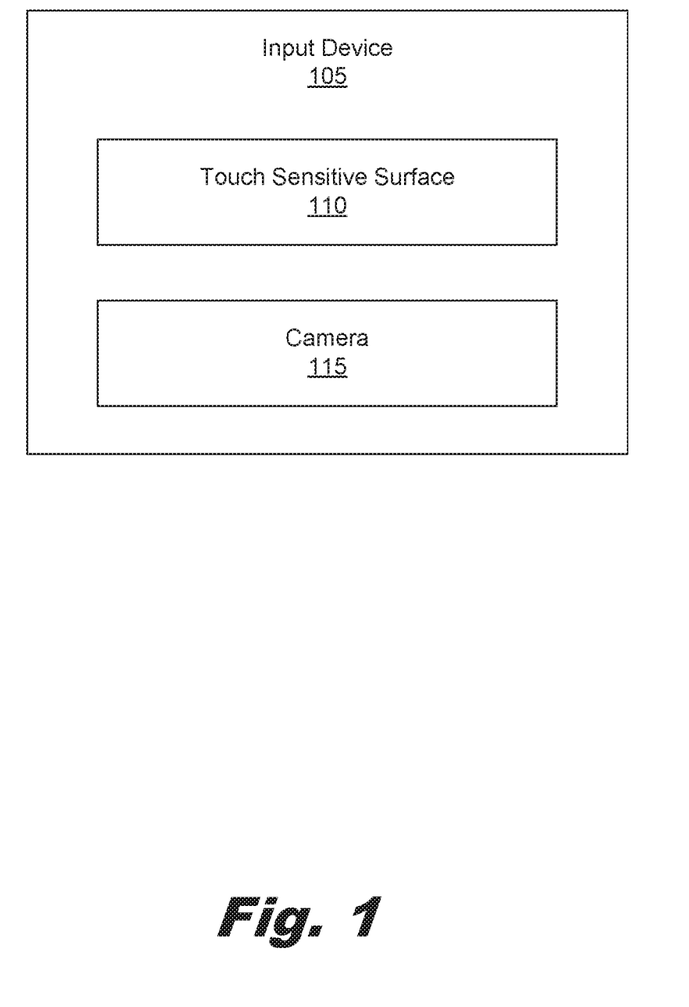
FIG. 1 is a block diagram of an input device according to one example of the principles described herein.

Turning now to the figures, FIG. 1 is a block diagram of an input device (105) according to one example of the principles described herein. The input device (105) may be communicatively coupled to a computing device. Examples of computing devices include servers, desktop computers, laptop computers, personal digital assistants (PDAs), mobile devices, smartphones, gaming systems, and tablets, among other electronic devices. The input device (105) may provide input to the computing device as described herein.

The computing device may be utilized in any data processing scenario including, stand-alone hardware, mobile applications, through a computing network, or combinations thereof. Further, the computing device may be used in a computing network, a public cloud network, a private cloud network, a hybrid cloud network, other forms of networks, or combinations thereof.

To achieve its desired functionality, the computing device associated with the input device (105) includes various hardware components. Among these hardware components may be a number of processors, a number of data storage devices, a number of peripheral device adapters, and a number of network adapters. These hardware components may be interconnected through the use of a number of busses and/or network connections. In one example, the processor, data storage device, peripheral device adapters, and a network adapter may be communicatively coupled via a bus.

The processor may include the hardware architecture to retrieve executable code from the data storage device, receive input from the input device (105), and execute the executable code while processing the input. The executable code may, when executed by the processor, cause the processor to implement at least the functionality of capturing an image of at least one object on a surface of a touch sensitive device, receiving user actuated input from the touch sensitive device at the location of the at least one object, mapping the received user actuated input to the surface of the touch sensitive device, and receiving instructions to assign an action to the at least one object according to the methods of the present specification described herein. In the course of executing code, the processor may receive input from and provide output to a number of the remaining hardware units.

The data storage device may store data such as executable program code that is executed by the processor or other processing device. The data storage device may specifically store computer code representing a number of applications that the processor executes to implement at least the functionality described herein.

The data storage device may include various types of memory modules, including volatile and nonvolatile memory. For example, the data storage device of the present example includes Random Access Memory (RAM), Read Only Memory (ROM), and Hard Disk Drive (HDD) memory. Many other types of memory may also be utilized, and the present specification contemplates the use of many varying type(s) of memory in the data storage device as may suit a particular application of the principles described herein. In certain examples, different types of memory in the data storage device may be used for different data storage needs. For example, in certain examples the processor may boot from Read Only Memory (ROM), maintain nonvolatile storage in the Hard Disk Drive (HDD) memory, and execute program code stored in Random Access Memory (RAM).

Generally, the data storage device may include a computer readable medium, a computer readable storage medium, or a non-transitory computer readable medium, among others. For example, the data storage device may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The hardware adapters of the computing device enable the processor to interface with various other hardware elements, external and internal to the computing device. For example, the peripheral device adapters may provide an interface to input/output devices such as the input device (105) a display device, a mouse, and/or a keyboard. The peripheral device adapters may also provide access to other external devices such as an external storage device, a number of network devices such as, for example, servers, switches, and routers, client devices, other types of computing devices, and combinations thereof.

The display device may be provided to allow a user of the input device (105) and computing device to interact with and implement the functionality of the input device (105). The peripheral device adapters may also create an interface between the processor and the display device, a printer, or other media output devices. The network adapter may provide an interface to other computing devices within, for example, a network, thereby enabling the transmission of data between the computing device and other devices located within the network.

The display device may, when executed by the processor, display the number of graphical user interfaces (GUIs) with the executable program code representing the number of applications stored on the data storage device. The GUIs may include aspects of the executable code including instructions to a user and requests for instructions from a user. The GUIs may display, for example, a number of GUIs that direct a user to setup and implement the input device (105) as described below. Examples of display devices include a computer screen, a laptop screen, a mobile device screen, a personal digital assistant (PDA) screen, and a tablet screen, among other display devices.

The touch sensitive surface (110) may be any surface or pad incorporated into a touch sensitive device that senses a touch from a user and interprets that touch as an assigned input to the processor of the computing device. In an example, the touch sensitive surface (110) may receive user actuated input on touch sensitive surface (110) at the location of the at least one object that has been placed on the touch sensitive surface (110). In an example, the touch sensitive surface (110) receives user actuated input from the touch sensitive surface (110) at a location of a projection of at least one object that has been recorded by a camera (115) and projected onto the touch sensitive surface (110) by, for example, a projector. As will be described in more detail below, in an example, the touch sensitive surface (110) may receive user actuated input from a display device such as a touch sensitive screen after the image has been presented on the display device. Thus, in this example, a user may interface with a display device rather than a projected image on the touch sensitive surface (110). This may provide a user with further options during the assignment of actions to the object described herein.

As will be described in more detail below, the touch sensitive surface (110) may be overlaid with a user-formed surface onto which the at least one object has been coupled. The user-formed surface, in an example, may include a sheet of paper or other thin surface with at least one foam, plastic, or other physically touchable object removably or non-removably coupled to the surface. In an example, the at least one object is a preformed piece of cardboard, a piece of ethylene-vinyl acetate (EVA), or other physically touchable object.

The camera (115) may be any device that is capable of capturing an image the at least one object on the touch sensitive surface (110) as well as the touch sensitive surface (110) itself. The image captured by the camera (115) may be used to detect the position of the at least one object on the touch sensitive surface (110) and allow a user to confirm the position of the at least one object on the touch sensitive surface (110). This will be described in more detail below.

During operation of the input device (105), a user may place the at least one object onto the touch sensitive surface (110). The arrangement of the at least one object allows a user to customize a layout of the at least one object to ergonomically fit the user's hands and fingers such that a user more easily access the object for future input via the input device (105) as described herein.

As described above, the layout of the number of objects may include placing a number of physically touchable objects directly onto the touch sensitive surface (110) and/or coupling the number of physically touchable objects onto a surface of a sheet of paper or other pliable surface and then laying that pliable surface onto the touch sensitive surface (110). In either example, the touch sensitive surface (110) may detect a touch from the user as the user touches the number of objects.

Once the user has laid out the at least one object onto the touch sensitive surface (110), the camera (115) may capture an image of the at least one object laid out by the user on the touch sensitive surface (110). A mapping process may then be initiated that determines the position of the at least one object and receives input from the user via the touch sensitive surface (110) to assign an action to the at least one object.

Once the camera (115) captures the image of the at least one object on the touch sensitive surface (110), a projector may project the image over the at least one object to be mapped. In a number of iterations and via a projected graphical user interface (GUI) projected with the image, the user may be requested to touch the at least one object to allow the touch sensitive surface (110) to determine the position of the at least on object on the touch sensitive surface (110). The at least one object to be mapped may be outlined or indicated using this GUI. In an example, the indicated at least one object to be mapped may be so indicated using a laser or a projected outline of the at least one object. The detection of the at least one object by the camera (115) and projector may be accomplished through the use of an image analyzing software executed by a processor associated with the input device (105). In this example, the captured image of the at least one object on the touch sensitive surface (110) is analyzed and the outline of the at least one object is determined. As confirmation, the user is requested to touch the at least one object to map the at least one object on the touch sensitive surface (110).

In an example where the image analyzing software does not detect the at least one object within the image projected by the projector, a user may indicate the position of the at least one object manually. In an example, the projector may project a number of actuatable tools onto the touch sensitive surface (110) that the user may implement to manually indicate the position of the at least one object. In this example, the GUI may include a pen tool for the user to select and for the user to freehand draw an outline around the at least one object. Further tools may also include shape tools that the user can select to also manually indicate the position of the at least one object. These shape tools may include a polygon tool, a circle tool, and/or a line tool, among others. In an example, the processor associated with the input device (105) may receive the touch input and object position indication input from the touch sensitive surface (110) and map the at least one object accordingly.

After the at least one object has been mapped, the user may be provided with the option to assign a specific action to the at least one object. In an example, the GUI projected onto the touch sensitive surface (110) may again highlight a mapped object and provide an option to assign an action to that specific object. In an example, a drop-down menu may be provided to a user to select an action to be assigned to the object when touched by the user. The user may select an action by interfacing with the drop-down menu and touching a portion of the touch sensitive surface (110) where the desired action is located In an example, a user may be provided with an entry box next to the object to have an action assigned to. In this example, the user may implement a standard keyboard to assign the action to the at least one object. In this example, a physical keyboard associated with the input device (105) may be used to provided data within the entry box. In this example, the user may actuate at least one key on the standard keyboard and the entry box may reflect the actuation of that key in the entry box. In an example, the projector may project a keyboard layout onto the touch sensitive surface (110) using the projector. In this example, the user may also actuate at least one key on the projected keyboard in order to reflect the actuation of that key in the entry box.

As described, the at least one object may be assigned an action when the user interacts with the input device and during the setup process described herein. The types of actions assigned may include, for example, any keyboard key, any mouse button click, any joystick buttons, and any system actions, among others. In an example, an action may include the opening or execution of certain applications being executed on a computing device associated with the input device (105). In an example, an action may include the opening of a website via a browser application executed on a computing device associated with the input device (105). In an example, the action may include, forwarding, replying to, and/or sending an email via an email application executed on a computing device associated with the input device (105). In an example, the action may include a combination of keys used as shortcuts or hotkeys that execute certain functions within an application being executed on a computing device associated with the input device (105).

After each object of the at least one object has been assigned an action, the projector may project a GUI onto the touch sensitive surface (110) requesting whether the user would like to assign the current layout a specific profile name. In doing so, the specific profile may be used later. In the example where the at least one object has been affixed to a pliable media such as paper, the user may assign a name to that profile for later use. When that profile is not to be used, the user may simply remove the pliable media and the at least one object from the touch sensitive surface (110) and store it away for later use. The input device may further allow a user to open the profile and once again use the arrangement of objects on the pliable media again. To accomplish this, the user may remove the pliable media and the at least one object from storage and place it on the touch sensitive surface (110). The camera (115) of the input device (105) may detect the layout of the at least one object and present a GUI to the user via the projector inquiring if the layout is a previously defined profile. The user may then interact with the touch sensitive surface (110) to select an option of which profile is being requested. Once the profile is selected, the user may proceed with using the pre-defined profile by interacting with the at least one object on the pliable media placed on the touch sensitive surface (110).

The present specification has described the use of a physical object being placed on the touch sensitive surface (110) as an object that may be assigned an action. Implementing a physical object such as the at least one object described above, provides for a physical object a user may interact with during input on the input device (105). This allows for tactile interaction with a physical object rather than virtual interaction with a projected "object" on the touch sensitive surface (110) by the projector. As such, a user may be relatively more confident that the objects he/she is interacting with are the desired objects. Although the present specification describes the specific use of the at least one object, in an example, the above-described projector may simply project an image on to the touch sensitive surface (110) of the at least one object previously placed on the touch sensitive surface (110) during the above described action assignment process. In this example, the user does not or will not have a tactile object to interface with. However, in this example, the use will not have to store the pliable media and the at least one object for later use. Thus, although the present specification describes the input device (105) as using the at least one object coupled to the pliable media, this is meant merely as an example and the alternative described above is also contemplated.

In an example, a user may further be provided with the option to adjust a saved profile. In this example, the user may be provided with a GUI on the touch sensitive surface (110) via the projector that allows the user to complete the adjustment of the at least one object on the surface of the touch sensitive surface (110) and pliable media. In an example, the GUI projected onto the touch sensitive surface (110) may include an adjustment button that, when selected, indicates the position of the at least one object on the pliable media and requests a user to move or alter the layout of the at least one object. The detection process of the new position of the at least one object may be accomplished as described above with a new image being captured by the camera (115) and an analysis of the position of the at least one object on the touch sensitive surface (110). The user may maintain the assignment of the action assigned to the at least one object but only change the position of the at least one object. This allows a user to try a certain layout of the at least one object and adjust the position to better fit a user's needs. Specifically, a user may create a profile that is ergonomically best for the user. Such customization could not be accomplished using a standard keyboard or other premanufactured input device.

Figure 2:
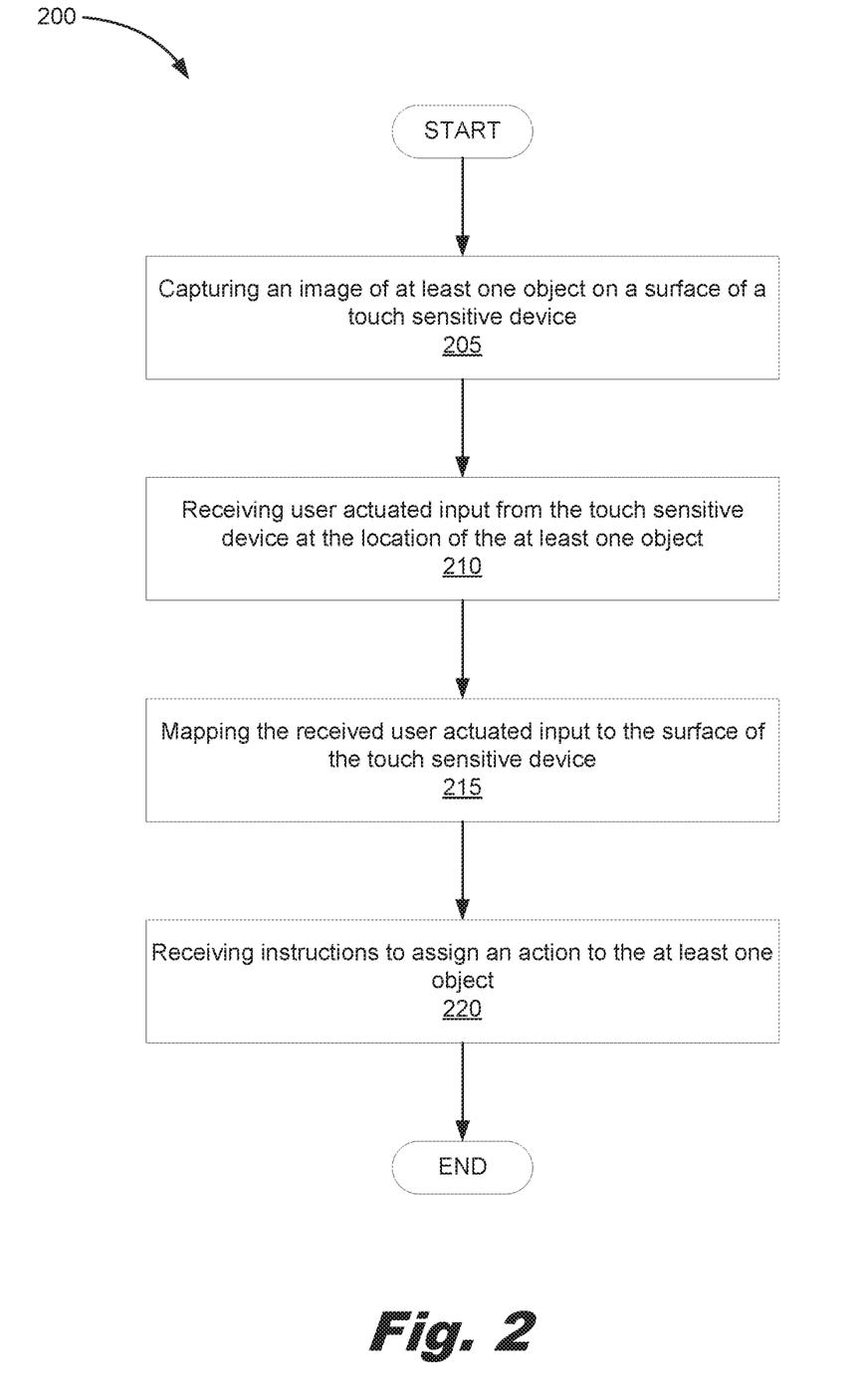
FIG. 2 is a flowchart diagram showing method of creating an input device according to an example of the principles described herein.

FIG. 2 is a flowchart diagram showing method (200) of creating an input device according to an example of the principles described herein. The method (20) may begin with capturing (205) an image of at least one object on a surface of a touch sensitive device.

As described above, the at least on object may be mapped to the surface of the touch sensitive device such that the physical location of the at least one object may be known. The method (200), therefore, continues with receiving (210) user actuated input from the touch sensitive device at the location of the at least one object. In an example, this may include user confirmation that the at least one object is in the location as analyzed and detected by the camera (115), processor, and input device (105) as described above. In an example, this may also include user interaction with a number of tools projected onto the surface of the touch sensitive device to mark or otherwise indicate where the at least one object is located on the surface of the touch sensitive device.

The method (200) may continue with mapping (215) the received user activated input to the surface of the touch sensitive device. As described above, the input device (105) may receive input from the touch sensitive surface (110) indicative of locational information of the at least one object. Further, the image captured by the camera (115) may be analyzed using image analyzing software executed by a processor of a computing device associated with the input device (105). The analysis of the image may confirm the location of the at least one object or indicate the location of the at least one object on the surface of the touch sensitive device.

The method (200) may continue with receiving (220) instructions to assign an action to the at least one object. In an example, the touch sensitive device may include a projector that projects any number of images onto the surface of the touch sensitive device. Along with the tools projected onto the surface, the projector may further project nay number of GUIs. One such GUI may include a drop-down box. The drop down box is provided such that the user may select from the drop-down box an action to be assigned to the at least one object. Alternatively, the projector may project an input box next to or at least associated with the at least one object into which the user may manually input an action to be assigned to the at least one object. It is understood that the assignment of the at least one object using the above described methods is not limited to these methods. Instead, the present specification contemplates the use of any action and/or GUI to provide for the receipt (220) of instructions to assign an action to the at least one object.

In an example, a GUI may be presented to the user requesting a profile assignment to the current layout of the at least one object on the touch sensitive device. A user may provide a name to the profile such that the current layout may be removed from the touch sensitive device for later use. This allows a user to use multiple different layouts for multiple different purposes. In an example, a keyboard layout comprising letters and numbers indicated by a number of objects assigned by the user may be assigned a profile name of "Profile 1." In this example, Profile 1 may be used in connection with a word processing application being executed on a computing device associated with the input device (105). In another example, a gaming profile comprising a number of directional arrows and avatar actuation buttons also indicated by a number of objects may be saved under the profile name "Profile 2." Profile 2 may be used in connection with a gaming application being executed on a computing device associated with the input device (105). In still another example, a calculator profile comprising a number pad indicated by a number of objects and mathematical operations also indicated by a number of objects may be assigned a profile name of "Profile 3." Profile 3 may be used in connection with a calculating application being executed on a computing device associated with the input device (105). Each of these profiles may be saved for later use by the user. For example, a user could switch from using Profile 2 in use for a gaming application to Profile 1 in order to engage in, for example, word processing tasks. The change from profile to profile may be indicated by the user using the touch sensitive surface (110). In this example, a GUI may be presented on the surface of the touch sensitive device that allows a user to indicate the switching between profiles. In this example, the user may remove the appropriate physical pliable media and objects from storage and place them on the surface of the touch sensitive device as described above. As such, any number of layouts may be created by a user for any number of tasks to be completed when the input device (105) provides input to a processor of a computing device.

Figure 3:
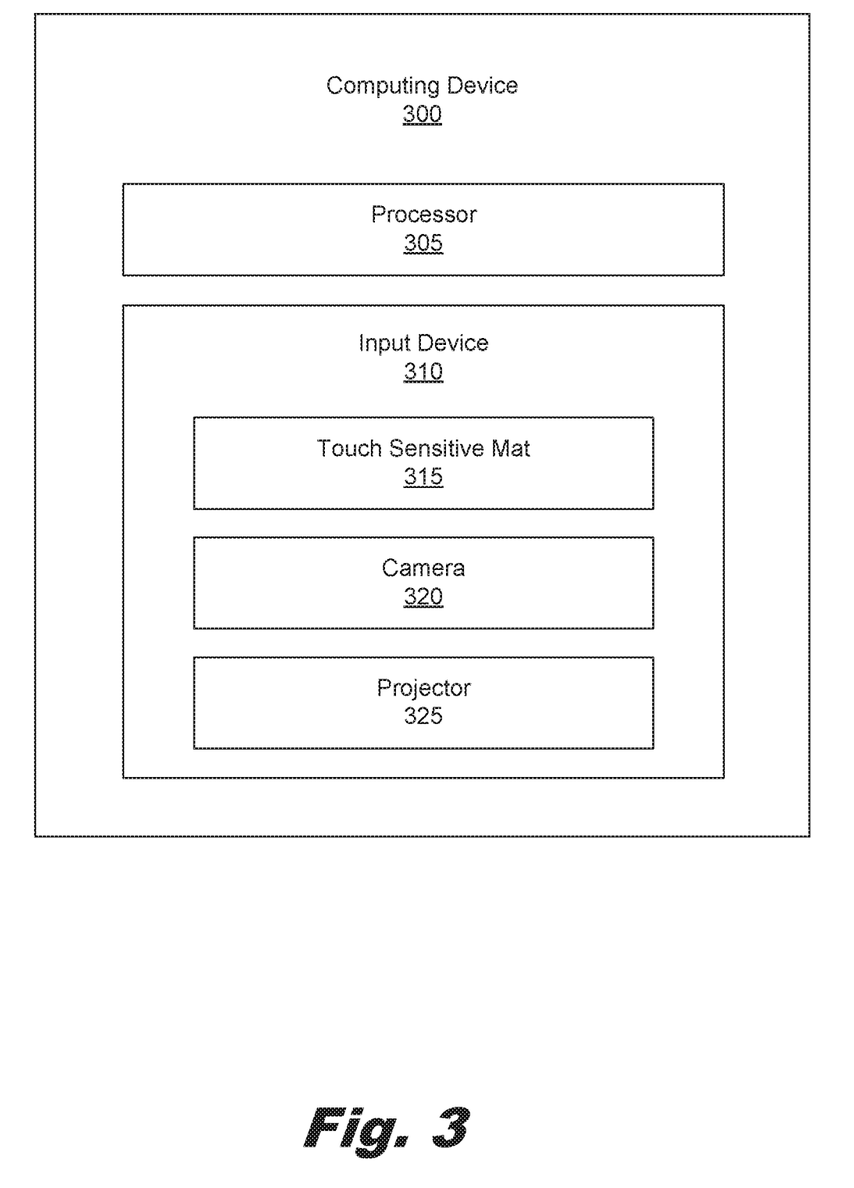
FIG. 3 is a block diagram of a computing device according to one example of the principles described herein.

FIG. 3 is a block diagram of a computing device (300) according to one example of the principles described herein. As described above, the input device (105, 310) may be associated with a computing device such that the user may engage with software applications being executed by a processor (305) of the computing device (300).

In an example, the computing device (300) may include the input device (105, 310) as a physical hardware device coupled to the computing device (300). In an example, the input device (105, 310) is in communication with the computing device (300) either wirelessly or via a cable. The computing device (300) may include any hardware adapter that allows communication between the computing device (300) and the input device (105, 310) to be accomplished.

As descried above, the processor (305) may, at least, analyze an image captured by a camera (115, 320) by executing image analyzing software, receive input from the input device (105) and its touch sensitive mat (315), and provide output to, for example, a projector (325) and/or computer screen associated with the computing device (300). In doing so the processor (305) may be configured to execute any software including applications and drivers in order to accomplish the methods and tasks described herein.

As briefly described above, instead of a projector, a user may direct the captured image from the camera (320) to be displayed on a display device associated with the computing device (300). In this example, a user may interact with the display device by using a mouse or, in the case where the display device is a touch sensitive screen, interfacing with the display device itself. Further, in this example, the user may be presented with the same or similar GUIs as described above that the touch sensitive mat (315). The user may then provide input to the computing device (300) indicating the location of the at least one object as well as instructions on which objects are to be assigned which action.

Figure 4:
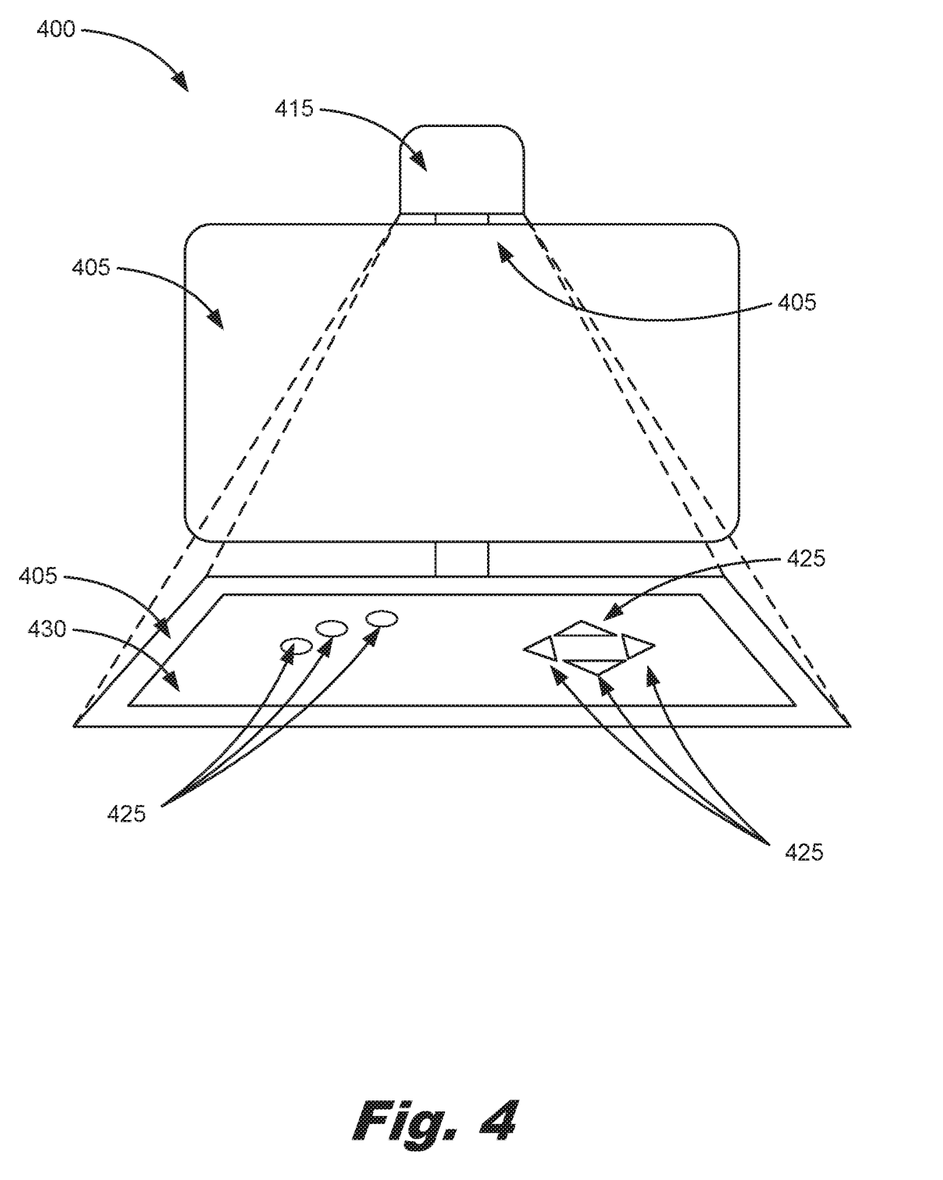
FIG. 4 is a front view diagram of an input system according to an example of the principles described herein.

FIG. 4 is a front view diagram of an input system (400) according to an example of the principles described herein. The input system (400) may include a display device (405) such as a computer screen, a touch sensitive device (410), a projector (415), a camera (420), and a number of objects (425) arranged on the surface of the touch sensitive device (405) and coupled to a pliable sheet of media (430).

As described above, the input system (400) may allow a user to interact with a number of applications executed by a computing device (300) and its associated GUIs presented on the display device (405). In order to provide for the additional user interaction described herein, the projector (415) may project additional GUIs onto the surface of the touch sensitive device (405) that allow a user to interact with the number of objects (425) and coupled to the pliable sheet of media (430). These additional interactions may include the assignment of actions to the individual number of objects (425); the assignment of a profile to the arrangement of the number of objects (425); the indication and confirmation of the placement of the number of objects (425) on the surface of the touch sensitive device (405); and the switching from a profile to another profile; among other tasks described herein.

Figure 5:
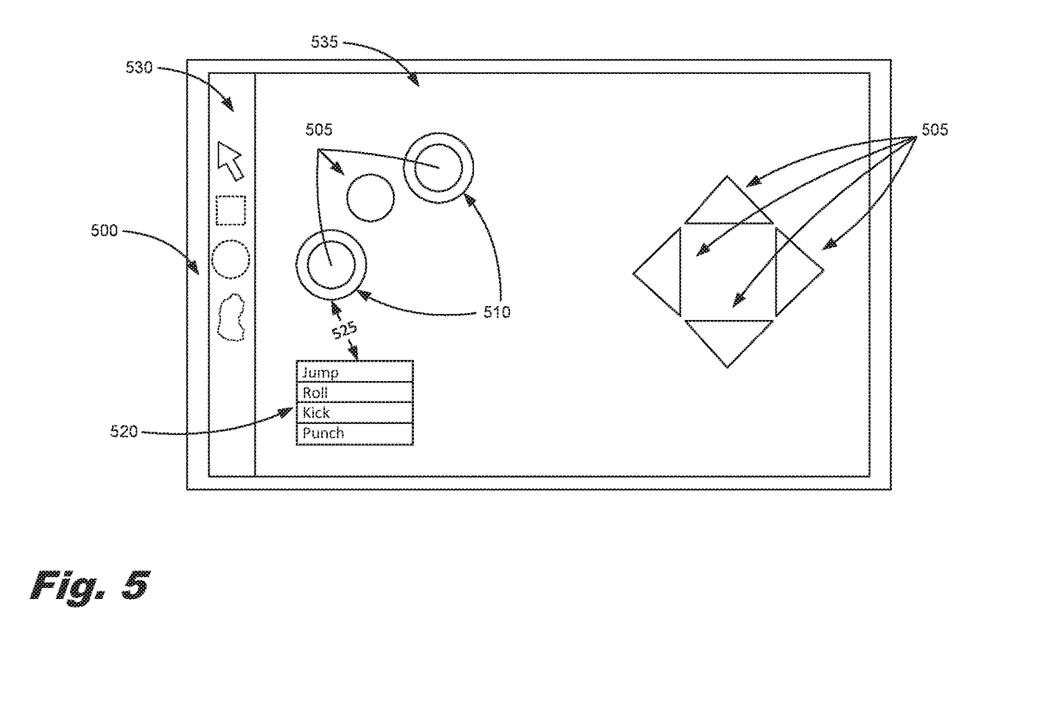
FIG. 5 is a top view block diagram of a touch sensitive device overlaid with a number of objects according to an example of the principles described herein.

FIG. 5 is a top view block diagram of a touch sensitive device (500) overlaid with a number of objects (505) according to an example of the principles described herein. The projector (FIG. 4, 415) may project a number of GUIs on to the surface of the touch sensitive device (500). One GUI may include an autodetection indicator (510) that indicates to the user that a number of objects (505) have been detected within the image captured by the camera (FIG. 4, 405). As described above, the processor (FIG. 3, 305) of the computing device (FIG. 3, 300) may analyze the image captured by the camera (FIG. 4, 405) for the number of objects (505) placed on the surface of the touch sensitive device (500). Where the processor (FIG. 3, 305) find a number of objects (505), it may indicate the detected position on the surface of the touch sensitive device (500) by projecting the autodetection indicator (510) around the number of objects (505). This allows a user to know which of the number of objects (505) have been discovered and which are to be specifically indicated by the user using the mapping tools (515).

The projector (FIG. 4, 415) may further project a drop down menu (520) and line (525) indicating a suggested assignment of an action to a specific object (505). The drop-down menu (520) may list a number of possible actions to be associated with the specific object (505). In the example shown in FIG. 5, the suggested actions are geared towards a gaming theme. In an example, the actions suggested in the drop-down menu (520) may be provided based on the shape of the object detected. In an example, the actions suggested in the drop-down menu (520) may be provided based on the layout of the number of objects (505) or the specific object (505) relative to other objects (505). In an example, a computing device (FIG. 3, 300) may provide the suggested actions based on an indicated software application or software application currently running on the computing device (FIG. 3, 300). In an example, the drop-down menu (520) may include application specific actions arrange by application and provided in sub-menus. Thus, the computing device (FIG. 3, 300), via the processor (FIG. 3, 305), may provide the input device (105, 310) with a list of applications installed on the computing device (FIG. 3, 300) as well as their respective potential actions. This information may be presented to the user in the drop-down menu (520). By touching the surface of the touch sensitive device (500) at the location of the action to be assigned to the specific object (505), the touch sensitive device (500) registers that touch, coordinates it with the action displayed, and sends an assignment signal to the processor (FIG. 3, 305). The processor (FIG. 3, 305) then assigns that action to the object in preparation for use of the object on the touch sensitive device (500) as well as saving the assignment information as a profile.

The projector (FIG. 4, 415) may further project a mapping tools menu (530) onto, at least, a portion of the touch sensitive device (500). The mapping tools menu (530) allows a user to select a tool in order to draw a manual indicator around an object not detected by the camera (FIG. 4, 405) and processor (FIG. 3, 305). In the example where the image analyzing software does not detect an object on the surface of the touch sensitive device (500), a user is to indicate the position of the object manually. During operation, the user may do so by touching the point on the surface of the touch sensitive device (500) where a tool is located and then, as the tool is in a selected state, use the tool to draw an indicator around the undetected object. The available tools of the mapping tools menu (530) may include a box tool, a circle tool, a freeform tool, and an arrow tool, among others. Any number of tools may be available in the mapping tools menu (530) and the present disclosure is not meant to limit the actions available to the user. Instead, any tool may be provided that allows a user to draw an outline or other indicator around or near an object located on the surface of the touch sensitive device (500).

As described above, the number of objects (505) may be coupled to a pliable sheet of media (535). The pliable sheet of media (535) may be thin and pliable enough in order for the touch sensitive device (500) to detect a touch of the number of objects (505) above the pliable sheet of media (535). Thus, the pliable sheet of media (535) may be thin such that when a user touches a top surface of the number of objects (505), the pressure may be detected through the number of objects (505), through the pliable sheet of media (535), and onto the surface of the touch sensitive device (500).

Figure 6:
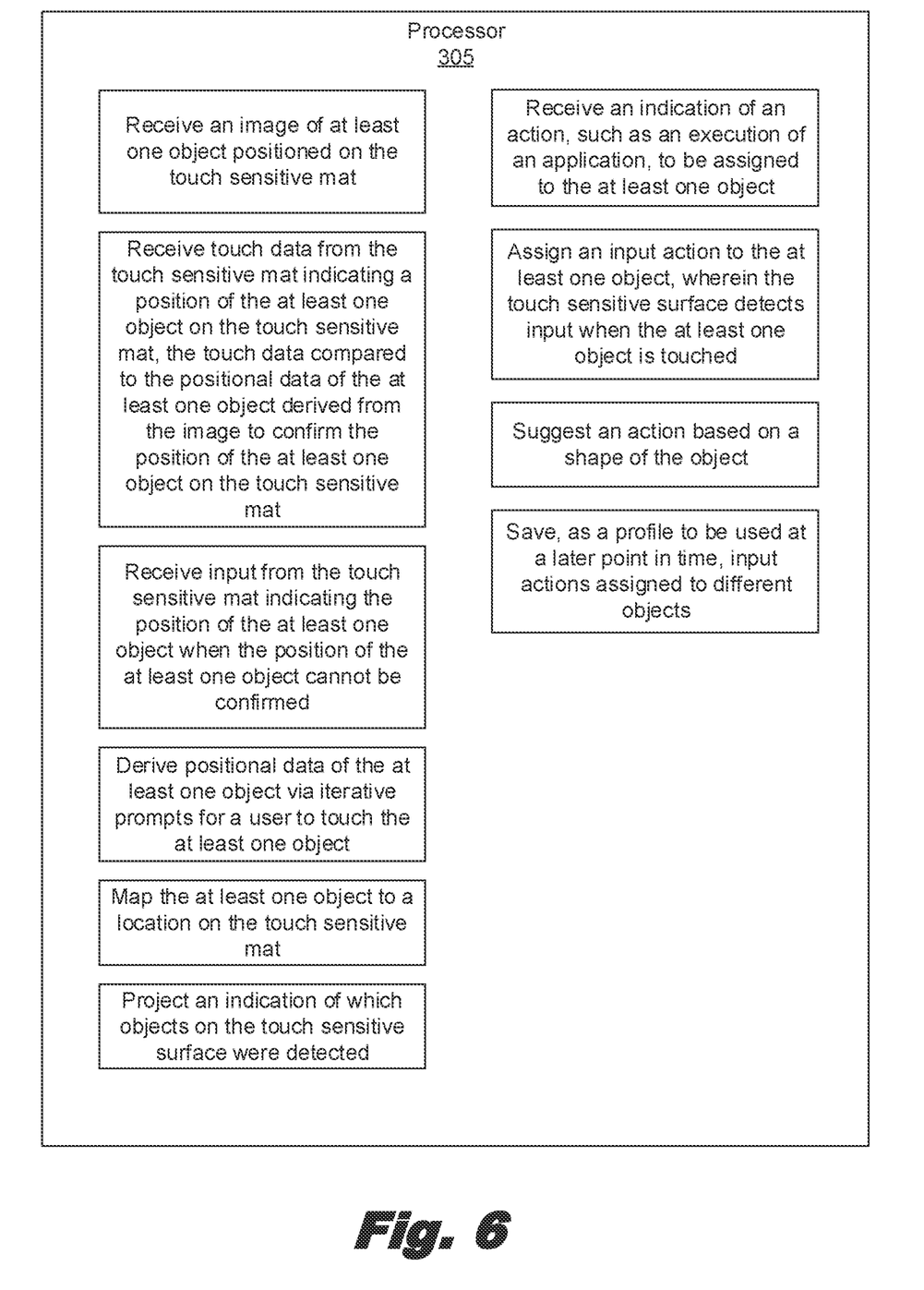
FIG. 6 is a block diagram of a processor according to one example of the principles described herein.

FIG. 6 is a block diagram of a processor 305 according to one example of the principles described herein. As described above, the computing device (300) may include a processor (305) to execute various functionalities. For example, the processor (305) may map the at least one object to a location on the touch sensitive surface, project an indication of which objects on the touch sensitive surface were detected; assign an input action to the at least one object, wherein the touch sensitive surface detects input when the at least one object is touched; and save, as a profile to be used at a later point in time, input actions assigned to different objects. The processor (305) may also receive an image of at least one object positioned on the touch sensitive mat derive positional data of the at least one object via iterative prompts for the user to touch the at least one object. The processor (306) may also receive an indication of an action to be assigned to the at least one object. The action may include executing an application.

In an example, the processor (305) receives touch data from the touch sensitive mat indicating a position of the at least one object on the touch sensitive mat. The touch data is compared to the positional data of the at least one object derived from the image to confirm the position of the at least one object on the touch sensitive mat. The processor (305) also receives input from the touch sensitive mat indicating the position of the at least one object when the position of the at least one object cannot be confirmed. The processor (305) may suggest an action based on a shape of an object.

Figure 7:
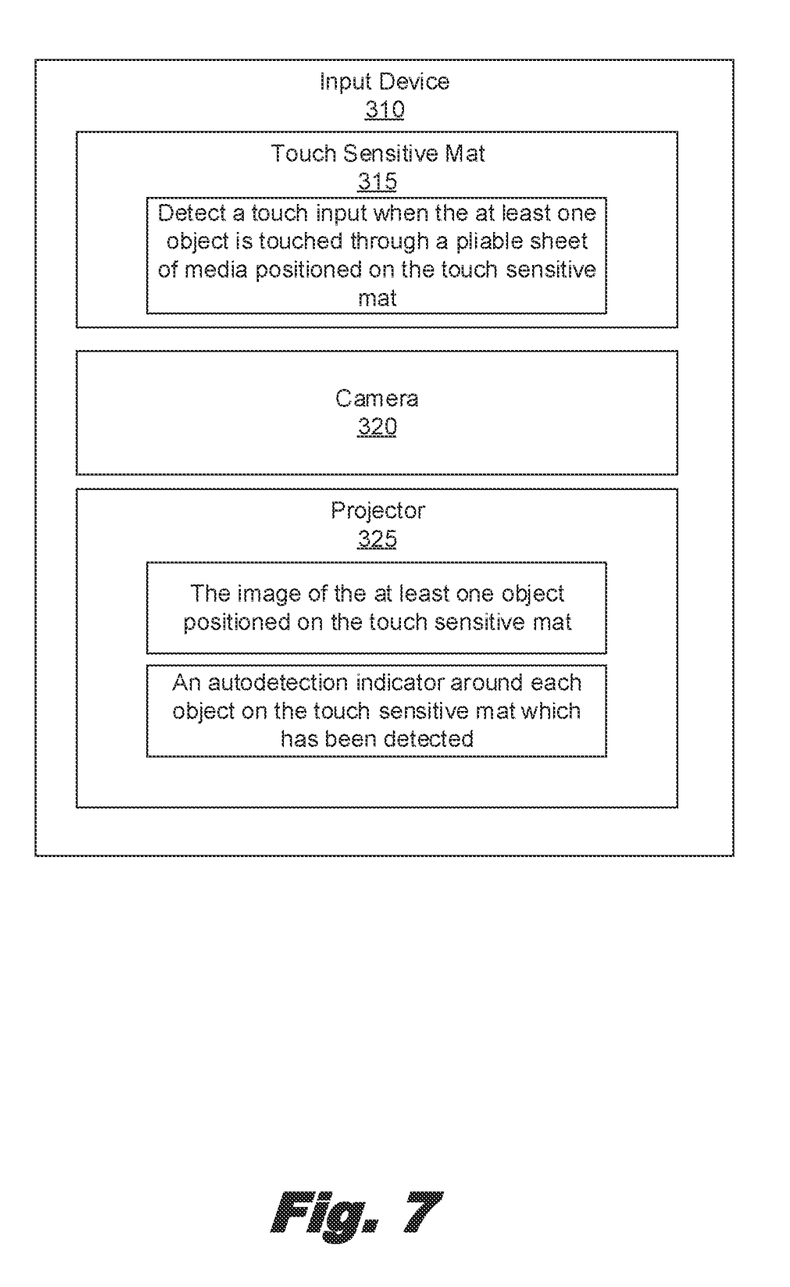
FIG. 7 is a block diagram of an input device according to one example of the principles described herein.

FIG. 7 is a block diagram of the input device (310) according to one example of the principles described herein. As described above, the input device (310) may include a touch sensitive mat that detects input when the at least one object is touched. The touch sensitive mat (315) detects a touch input on the at least one object through a pliable sheet of media positioned on the touch sensitive mat. FIG. 7 also depicts the projector (325) which projects 1) the image of the at least one object positioned on the touch sensitive mat and 2) an autodetection indicator around each object on the touch sensitive mat which has been detected.

Figure 8A:
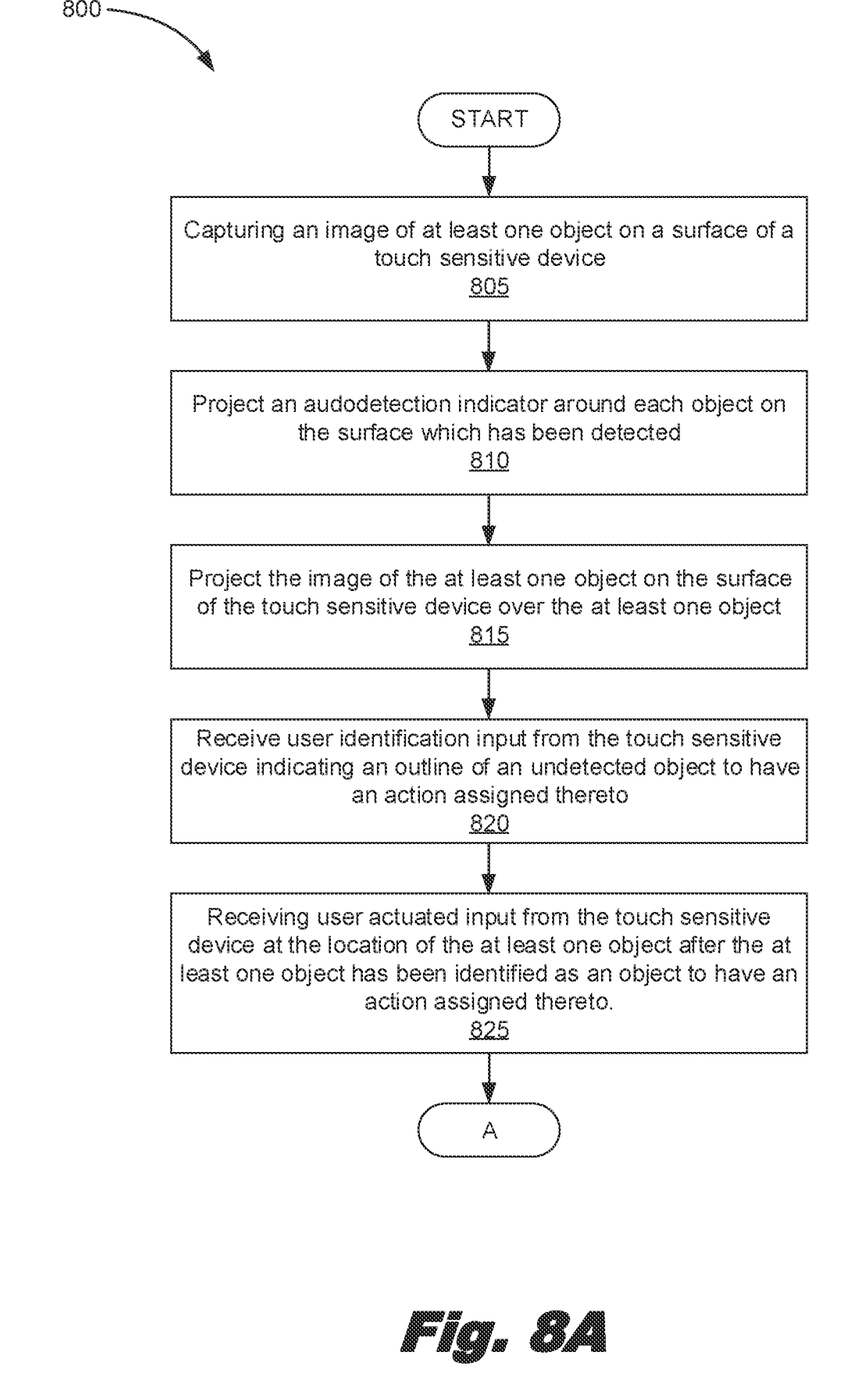
FIGS. 8a and 8b depict a flowchart showing a method of creating an input device according to an example of the principles described herein.
Figure 8B:
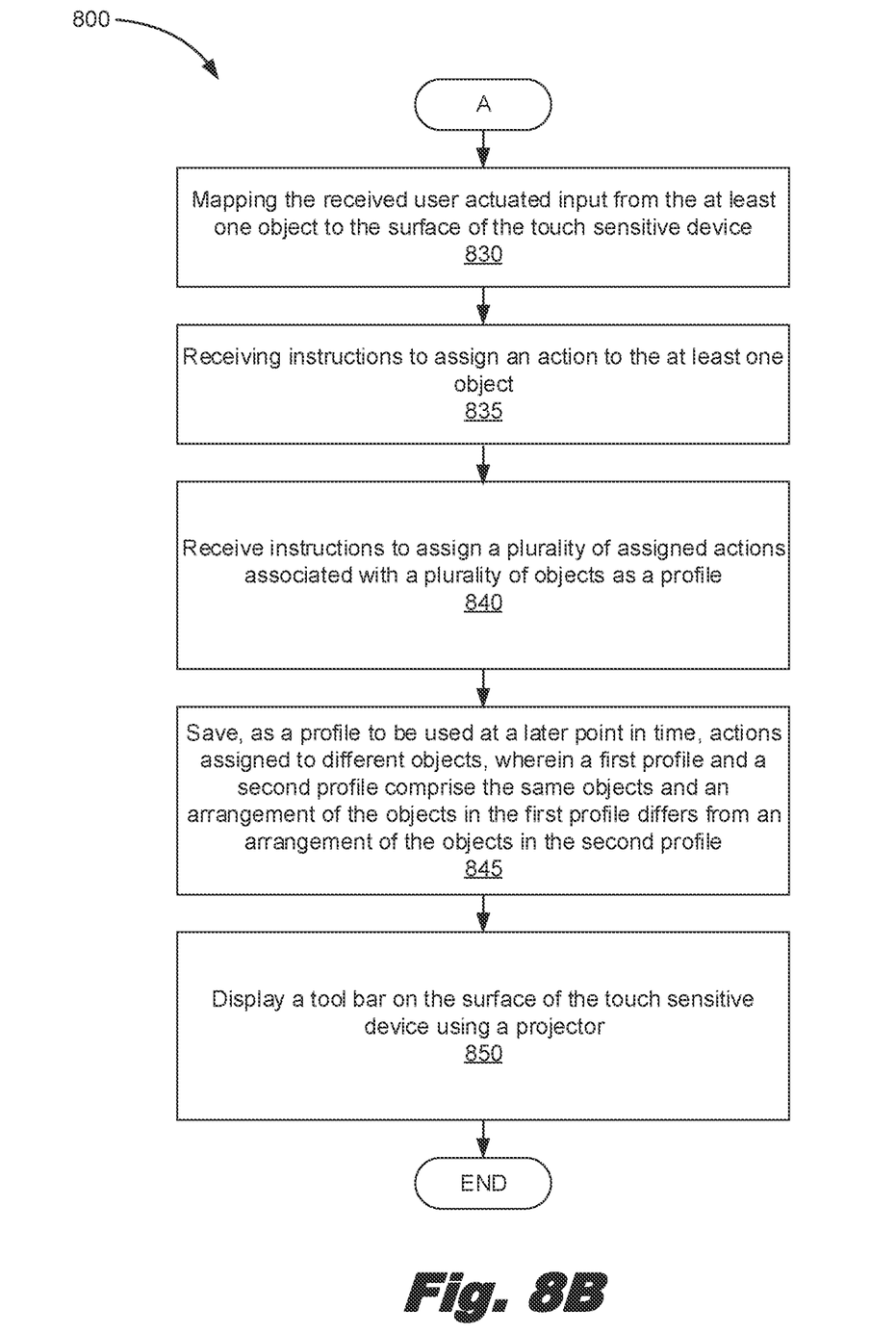

FIGS. 8A and 8B depict a flowchart showing a method (800) of creating an input device according to an example of the principles described herein. The method (800) may include capturing (805) an image of at least one object on a surface of a touch sensitive device. The method (800) may include projecting (810) an autodetection indicator around each object on the surface which has been detected. The method (800) may include projecting (815) the image of the at least one object on the surface of the touch sensitive device over the at least one object.

The method (80) may include receiving (820) user identification input from the touch sensitive device indicating an outline of an undetected object to have an action assigned thereto. The method (800) includes receiving (825) user actuated input from the touch sensitive device at the location of the at least one object after the at least one object has been identified as an object to have an action assigned thereto. The method (800) may continue with mapping (830) the received user actuated input from the at least one object to the surface of the touch sensitive device. The method (800) may continue with receiving (835) instructions to assign an action to the at least one object.

The method (800) may include receiving (840) instructions to assign a plurality of assigned actions associated with a plurality of objects as a profile and saving (block 845) as a profile to be used at a later point in time, actions assigned to different objects. In an example, a first profile and a second profile comprise same objects and an arrangement of the objects in the first profile differs from an arrangement of the objects in the second profile. The method (800) also includes displaying (850) a tool bar on the surface of the touch sensitive device using a projector.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general-purpose computer, special purpose computer, or other programmable data processing apparatus to produce a machine, such that the computer usable program code, when executed via, for example, processor (FIG. 3, 305) of the computing device (FIG. 3, 300) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe and input device that allows a user to customize the layout of actionable buttons or objects on the surface of a touch sensitive device. Further the assignment of the actions may be personalized such that a user may assign any available action to any of the available objects. This allows a user to create a relatively more ergonomic input device customized to the user. Not only could the assignment of the number of objects to tailored actions and arrangement of the number of objects on the surface of the touch sensitive device be customized to the user, but the arrangement may also be application specific and assigned a profile associated with an application to be executed on the computing device. This allows a user to have the most customize and ergonomic input device to assist the user. This may be helpful to users who also suffer from disfigurements in their hands and cannot physically interact with a standard keyboard or other input device.

The preceding description has been presented to illustrate and describe examples of the principles described. This description is not intended to be exhaustive or to limit these principles to any precise form disclosed. Many modifications and variations are possible in light of the above teaching.

What is claimed is:

1. An input device, comprising:
a touch sensitive surface; and
a camera to scan the touch sensitive surface with at least one object on the touch sensitive surface to create an image; and
a processor to:
map the at least one object to a location on the touch sensitive surface;
project an indication of which objects on the touch sensitive surface were detected;
assign an input action to the at least one object, wherein the touch sensitive surface detects input when the at least one object is touched; and
save, as a profile to be used at a later point in time, input actions assigned to different objects.

2. The input device of claim 1, further comprising a projector and wherein the projector projects a number of tools onto the touch sensitive surface, which tools are to facilitate indication of a position of the at least one object.

3. The input device of claim 2, wherein the number of tools comprise an object assignment tool to assign the at least one object an action, a drawing tool to draw an outline of the object on the touch sensitive surface, and a menu button to select at least one action therefrom and to assign the selected action to the at least one object.

4. The input device of claim 3, wherein a menu displays a number of suggested actions assignable to the at least one object, wherein suggestions are based on a software application to be run on a computing device associated with the input device.

5. The input device of claim 1, wherein the input device further comprises a processor to receive the created image of the touch sensitive surface comprising the at least one object and differentiates an image of the at least one object from an image of the touch sensitive surface.

6. A method of creating an input device, comprising:
capturing an image of at least one object on a surface of a touch sensitive device;
projecting an autodetection indicator around each object on the surface which has been detected;
projecting the image of the at least one object on the surface of the touch sensitive device;
receiving user actuated input at the at least one object;
mapping the received user actuated input from the at least one object to the surface of the touch sensitive device;
receiving instructions to assign an action to the at least one object; and
saving, as a profile to be used at a later point in time, actions assigned to different objects, wherein:
a first profile and a second profile comprise same objects; and
an arrangement of the objects in the first profile differs from an arrangement of the objects in the second profile.

7. The method of claim 6, further comprising receiving instructions to assign a plurality of assigned actions associated with a plurality of objects as the profile.

8. The method of claim 6, wherein receiving user actuated input from the touch sensitive device at a location of the at least one object occurs after the at least one object has been identified as an object to have an action assigned thereto.

9. The method of claim 6, further comprising displaying a tool bar on the surface of the touch sensitive device using a projector.

10. The method of claim 9, further comprising receiving user identification input from the touch sensitive device indicating an outline of an undetected object to have an action assigned thereto.

11. The method of claim 6, wherein the image of the at least one object is projected over the at least one object.

12. The method of claim 6, further comprising projecting on the touch sensitive device, an outline of the at least one object.

13. The method of claim 12, wherein the outline of the at least one object is projected around the at least one object positioned on the surface of the touch sensitive device.

14. The method of claim 6, further providing an indication that the at least one object has been detected within the image of the at least one object captured by a camera.

15. A computing device, comprising:
a processor; and
an input device, comprising:
a touch sensitive mat;
a camera to capture an image of at least one object positioned on the touch sensitive mat; and
a projector to project, onto the touch sensitive mat:
the image of the at least one object positioned on the touch sensitive mat;
an autodetection indicator around each object on the touch sensitive mat which has been detected; and
a menu of suggested actions to assign to the at least one object;
wherein the processor receives an image of at least one object positioned on the touch sensitive mat and derives positional data of the at least one object via iterative prompts for a user to touch the at least one object;
wherein the processor receives an indication of an action to be assigned to the at least one object; and
wherein the touch sensitive mat detects input when the at least one object is touched.

16. The computing device of claim 15, wherein the processor further receives touch data from the touch sensitive mat indicating a position of the at least one object on the touch sensitive mat and wherein the touch data is compared to the positional data of the at least one object derived from the image to confirm the position of the at least one object on the touch sensitive mat.

17. The computing device of claim 16, wherein the projector projects a number of images indicating tools used to indicate the position of the at least one object on the touch sensitive mat and the processor receives input from the touch sensitive mat indicating the position of the at least one object when the position of the at least one object cannot be confirmed.

18. The computing device of claim 16, wherein the touch sensitive mat detects a touch input on the at least one object through a pliable sheet of media positioned on the touch sensitive mat.

19. The computing device of claim 15, wherein the action comprises executing an application.

20. The computing device of claim 15, wherein an action is suggested based on a shape of an object.

* * * * *